UNITED STATES PATENT OFFICE.

THEODOR LICHTENHAHN, OF BASEL, SWITZERLAND, ASSIGNOR TO ELEKTRIZITÄTS-WERK LONZA, OF GAMPEL AND BASEL, SWITZERLAND.

PROCESS FOR WORKING UP RESIDUARY AMMONIUM-CHLORID LIQUORS FROM THE AMMONIA-SODA PROCESS.

1,398,135. Specification of Letters Patent. Patented Nov. 22, 1921.

No Drawing. Application filed May 28, 1921. Serial No. 473,378.

*To all whom it may concern:*

Be it known that I, THEODOR LICHTENHAHN, a citizen of the Swiss Republic, and resident of Basel, Switzerland, have invented a new and useful Process for Working Up Residuary Ammonium-Chlorid Liquors from the Ammonia-Soda Process, of which the following is a full, clear, and exact specification.

The residuary lye of the manufacture of sodium carbonate by the ammonia process contains calcium chlorid, which resulted from the driving off of the ammonia by means of lime, further soda (sodium carbonate) and about 40 per cent. of the employed sodium chlorid; it is mostly let off as inutilizable, whereby there results great losses of soda and of sodium chlorid and a soiling of the rivers. It was proposed to suppress the driving off of the ammonia by lime; according to these propositions the manufacturers of soda would have to purchase the necessary raw materials, ammonia and carbonic acid, and the residuary lye, which now contains no further calcium chlorid but great quantities of ammonium chlorid, would be worked up in order to get ammonium chlorid, which would be employed as a manure.

This process possesses the defect that it does not present a perfect method for the working up of the residuary lye in order to recover the salts therefrom in a solid and technically pure form.

The lye contains ammonium and sodium, combined with chlorin and carbonic acid. The hereafter described process allows the recovery of all salts technically pure as ammonium carbonate, ammonium chlorid and sodium chlorid in a solid form, without introducing new substances into the process. To this purpose the lye is heated nearly to its boiling point until all free carbonic acid and all the carbonic acid combined with ammonia has escaped. These substances thus driven off can be gathered easily in a solid form as carbonate, bicarbonate or mixtures of carbonate and bicarbonate. By taking appropriate measures, among which the addition of carbonic acid may be mentioned, it is possible to obtain the whole escaping ammonia in form of the bicarbonate which is particularly valuable for the manufacture of soda and can be employed again for the manufacture of soda.

The lye, containing now only all sodium and all chlorin and a part of the ammonia, is concentrated, according to the proportions of the quantities of the salts contained therein, to a $\frac{1}{3}$ or $\frac{2}{3}$ of its volume. Without care of the salts precipitated in the course of this concentration and constituting a mixture of sodium chlorid and of ammonium chlorid, the whole mass is cooled down at least to 25° C., for instance to 15° C. or less. Thereby technically pure ammonium chlorid precipitates, while the sodium chlorid remains dissolved. The precipitate is separated from the lye by centrifugation or filtration. If this lye be heated again to ebullition, that is to say, to about 110° C., the sodium chlorid begins to precipitate, as the temperature coefficient of the sodium chlorid solubility becomes negative in the solution mixture. Only sodium chlorid precipitates, if the solution is further evaporated until a determined point. This latter evaporation amounts again to $\frac{1}{3}$ or $\frac{2}{3}$ of the volume. Then the solution is separated by filtration or centrifugation, as nearly at the boiling temperature as possible, that is to say, at about 110° C., from the precipitate of technically pure sodium chlorid. The mother-lye contains again ammonium chlorid and sodium chlorid in a determined proportion which corresponds approximately with that of the original lye. By further evaporation and cooling to about 15° C. and separating the solid salt precipitated a portion of the solid ammonium chlorid can further be gathered. But it is generally preferable to mix the mother lye, remaining after the sodium chlorid has been crystallized out, with fresh residuary lye previously freed from the carbonic acid and to subject both together to the above described process. In this manner the salts contained in the lye are worked up quantitatively by gathering solid sodium chlorid, solid ammonium chlorid and solid ammonium carbonate, each for itself in a technically pure form. It may be pointed out, that no returning of the lye to the soda manufacture, which would require special pipe plants, becomes necessary. The ammonium chlorid can be purified by sublimation or recrystallization or the like but it can also be employed directly as manure, as it contains still only little sodium chlorid, which cannot be a nuisance for agriculture. The solid sodium chlorid can be set at the disposal of the soda manufacturers, which, if they work with watery ammonia, needs solid sodium chlorid for the concentration of their lyes, or can be employed for other technical purposes, or worked up to pure sodium chlorid. On the contrary the ammonium carbonate, which, as said above, is collected advantageously in the form of bicarbonate, is applicable without other manipulation for the manufacture of soda.

*Example.*

1 cubic meter of a residuary lye containing 31.5 kg. of Na, 168 kg. of Cl, 87.5 kg. of $NH_4$ and 45 kg. of $CO_3$ is heated for 1 hour at 93° C., whereby all $CO_2$ and a part of the $NH_3$ escapes and are condensed together as a mixture of carbonate and bicarbonate. The remaining lye contains 31.5 kg. of Na, 168 kg. of Cl, 60.5 kg. of $NH_4$, but no further carbonic acid. 27 kg. of $NH_4$ escaped with the carbonic acid. The liquor still contains 180 kg. of $NH_4Cl$ and 80 kg. of NaCl. It is evaporated to 0.45–0.50 cubic meter, cooled down to 15° C. and centrifugated. 127 kg. of a dry saline substance containing 121 kg. of $NH_4Cl$, 5 kg. of NaCl and little quantities of other salts, among which sulfate, that is to say, of a technical $NH_4Cl$ of 95 per cent., are thus obtained. The lye is evaporated to 0.2 cubic meter, filtered at 110° C. and gives thus 52 kg. of a solid saline substance containing 50 kg. of NaCl and 2 kg. of $NH_4Cl$. By further evaporating to 0.15 cubic meter, cooling down and filtering, there are precipitated still 41 kg. of a saline substance containing 39.5 kg. of solid $NH_4Cl$ and the final lye contains still 17.5 kg. of $NH_4Cl$ and 23.5 kg. of NaCl. The lye can be further evaporated and treated in the same manner, but it is preferably added to fresh residuary lyes. The resulting shifting of the proportion of NaCl to $NH_4Cl$ from 80:180 to for instance 86:165 in the lye free of carbonic acid does not modify the process essentially.

What I claim is:

The herein described process for the working up of the residuary ammonium chlorid lyes of the manufacture of soda by the ammonia process, in order to gather the carbonates and chlorids contained therein separately and in a technically pure form, which consists in heating the lye in order to drive off the free carbonic acid and the carbonic acid combined with ammonia and to collect these latter as ammonium carbonates, concentrating the remaining lye, according to the quantities of sodium chlorid and of ammonium chlorid contained therein, to $\frac{1}{2}-\frac{2}{3}$ of its volume, cooling it afterward below 25° C. and collecting the precipitated, technically pure ammonium chlorid by separating it from the liquid, evaporating further the said liquid, by heating it to the boiling point, to $\frac{1}{3}-\frac{2}{3}$ of its volume, and separating the precipitated solid sodium chlorid from the mother-lye at a temperature as near as possible to the boiling temperature.

In witness whereof I have hereunto signed my name this 14th day of May, 1921, in the presence of two subscribing witnesses.

THEODOR LICHTENHAHN.

Witnesses:
 FRIDA KURZ,
 AMAND RITTER.